(12) United States Patent
Arbel et al.

(10) Patent No.: US 9,558,129 B2
(45) Date of Patent: Jan. 31, 2017

(54) CIRCUITS FOR AND METHODS OF ENABLING THE ACCESS TO DATA

(71) Applicant: Xilinx, Inc., San Jose, CA (US)

(72) Inventors: Ygal Arbel, Morgan Hill, CA (US); James J. Murray, Los Gatos, CA (US); Hyun W. Kwon, San Jose, CA (US); Nishit Patel, San Jose, CA (US)

(73) Assignee: XILINX, INC., San Jose, CA (US)

( * ) Notice: Subject to any disclaimer, the term of this patent is extended or adjusted under 35 U.S.C. 154(b) by 203 days.

(21) Appl. No.: 14/301,008

(22) Filed: Jun. 10, 2014

(65) Prior Publication Data

US 2015/0356027 A1    Dec. 10, 2015

(51) Int. Cl.
*G06F 13/00*    (2006.01)
*G06F 12/14*    (2006.01)
*G06F 13/30*    (2006.01)
*G06F 13/28*    (2006.01)

(52) U.S. Cl.
CPC ............. *G06F 12/145* (2013.01); *G06F 13/00* (2013.01); *G06F 13/28* (2013.01); *G06F 13/30* (2013.01)

(58) Field of Classification Search
USPC ................ 710/22, 23, 33, 35, 105, 305, 308
See application file for complete search history.

(56) References Cited

U.S. PATENT DOCUMENTS

| | | | |
|---|---|---|---|
| 6,272,564 B1* | 8/2001 | Garrett et al. | 710/33 |
| 6,608,625 B1* | 8/2003 | Chin et al. | 345/501 |
| 7,352,766 B2 | 4/2008 | Van Asten et al. | |
| 7,406,557 B2 | 7/2008 | Dao et al. | |
| 7,552,415 B2 | 6/2009 | Sanchez et al. | |
| 2003/0110325 A1* | 6/2003 | Roach et al. | 710/22 |
| 2005/0060441 A1* | 3/2005 | Schmisseur | 710/22 |
| 2005/0240688 A1* | 10/2005 | Moerman et al. | 710/22 |
| 2009/0265526 A1 | 10/2009 | Goh | |
| 2012/0072618 A1 | 3/2012 | Fujimoto | |
| 2012/0284434 A1* | 11/2012 | Warren et al. | 710/22 |
| 2015/0121137 A1* | 4/2015 | McKnight et al. | 714/15 |
| 2015/0186311 A1* | 7/2015 | Yap et al. | 710/22 |

FOREIGN PATENT DOCUMENTS

| | | |
|---|---|---|
| EP | 1591906 | 11/2005 |
| JP | 2007312069 | 11/2007 |

* cited by examiner

*Primary Examiner* — Khanh Dang
(74) *Attorney, Agent, or Firm* — John J. King

(57) ABSTRACT

A circuit for enabling access to data is described. The circuit comprises a memory device storing data blocks having a first predetermined size; and a direct memory access circuit coupled to the memory device, the direct memory circuit accessing a data payload having a second predetermined size which is greater than the first predetermined size; wherein the direct memory access circuit accesses the data payload in response to a descriptor having a plurality of addresses corresponding to a predetermined number of the data blocks stored in the memory device. A method of enabling the access to data is also disclosed.

11 Claims, 6 Drawing Sheets

| Word No | Field Name | Size(bytes) | Bits | Description |
| --- | --- | --- | --- | --- |
| 0 | control | 4 | [7:0] [8] [9] [10] [11] [15:12] [17:16] [18] [19] [20] [21] [31:22] | preamble(8) enable completion interrupt (1) enable descriptor update(1) ignore done (1) AXI burst type INCR or FIXED (1) AXCACHE (4) AXPROT bits (2) Mode = descriptor mode (Continous Or fregmented ) Last Descriptor(1) Enable CRC (1) Last Dscr of Frame(1) Reserved(3) |
| 1 | DSCR_ID | 4 | [15:0] [31:16] | Descriptor ID (16) Reserved(16) |
| 2 | XFER_SIZE | 4 | [31:0] | Indicates transfer size in both modes (in Bytes ) |
| 3 | LINE_SIZE_STRIDE | 4 | [17:0] [31:18] | Horizontal Resolution( Line Size )(18) Stride (14) |
| 4 | Timestamp LSB | 4 | [31:0] | If enabled, DMA strores LSB of time stamp here (32) |
| 5 | Timestamp MSB | 4 | [9:0] [30:10] [31] | If enabled, DMA strores MSB of time stamp here(10) Reserved(21) Status/Done |
| 6 | ADDR_EXT | 4 | [11:0] [15:12] [27:16] [31:28] | NEXT Descriptor Extension (12) Reserved(4) SRC Address Extension (12) Reserved(4) |
| 7 | NEXT_DESR | 4 | [31:0] | Address of the next descriptor |
| 8 | SRC_ADDR | 4 | [31:0] | Source address |
| 9 | ADDR_EXT_23 | 4 | [11:0] [15:12] [27:16] [31:28] | Address Extension for SRC Addr2(12) Reserved(4) Address Extension for SRC Addr3(12) Reserved(4) |
| 10 | ADDR_EXT_45 | 4 | [31:0] | See ADDR_EXT_23 |
| 11 | SCR_ADDR2 | 4 | [31:0] | Source Addr-2nd page |
| 12 | SCR_ADDR3 | 4 | [31:0] | Source Addr-3rd page |
| 13 | SCR_ADDR4 | 4 | [31:0] | Source Addr-4th page |
| 14 | SCR_ADDR5 | 4 | [31:0] | Source Addr-5th page |
| 15 | CRC | 4 | [31:0] | CRC Value |

FIG. 2

| Fragment address | Actual Address | Size |
|---|---|---|
| SRC_ADDR | 0000_AF00 | 256Bytes |
| SRC_ADDR2 | 0000_C000 | 4096 |
| SRC_ADDR3 | 0000_D000 | 4096 |
| SRC_ADDR4 | 0000_F000 | 1552 |
| SRC_ADDR5 | NA | |
FIG. 3
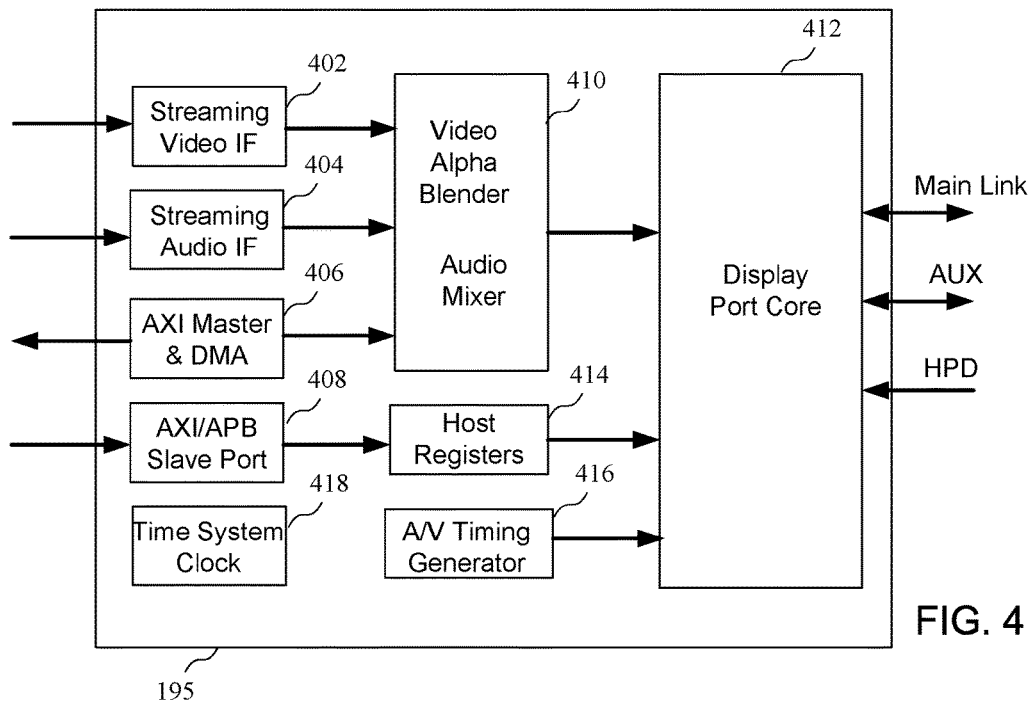
FIG. 4
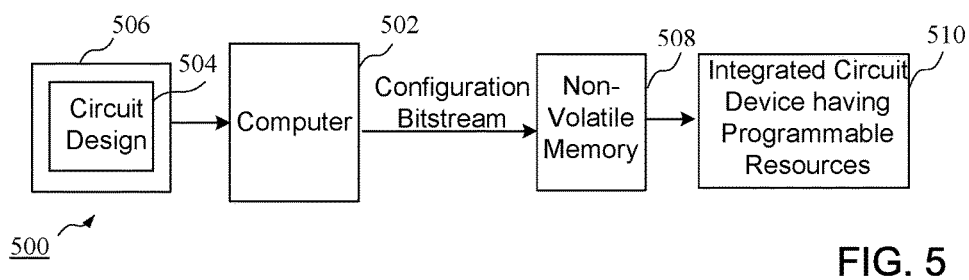
FIG. 5

US 9,558,129 B2

CIRCUITS FOR AND METHODS OF ENABLING THE ACCESS TO DATA

FIELD OF THE INVENTION

The present invention relates generally to integrated circuit devices, and in particular, to circuits for and methods of enabling access to data.

BACKGROUND OF THE INVENTION

Data transmission is an important part of many integrated circuits and systems having integrated circuits. Data is typically communicated with an integrated circuit by way of an input/output port. Data may be communicated in a system in different formats and according to a variety of data communication protocols. However, input/output circuits can significantly affect the performance of an integrated circuit device. Accordingly, memory access circuits are an important part of integrated circuit devices.

Advanced application processor systems operate in a virtual memory address domain, and may use a Memory Management Unit (MMU) to perform virtual-to-physical address mapping. The MMU is typically built into the processor unit and is not shared by other bus-mastering peripherals such as a direct memory access (DMA) device. Thus most DMA devices operate in the physical address space domain, and require extra software management for partitioning a virtual address range block into multiple contiguous physical address range blocks and for handling each such block as a separate task.

Accordingly, circuits and methods providing improved access to memory devices is desirable.

SUMMARY OF THE INVENTION

A circuit for enabling access to data is described. The circuit comprises a memory device storing data blocks having a first predetermined size; and a direct memory access circuit coupled to the memory device, the direct memory circuit accessing a data payload having a second predetermined size which is greater than the first predetermined size; wherein the direct memory access circuit accesses the data payload in response to a descriptor having a plurality of addresses corresponding to a predetermined number of the data blocks stored in the memory device.

Another circuit, implemented in an integrated circuit, for enabling access to data, the circuit comprises a memory device storing data blocks having a first predetermined size; a display port direct memory access circuit coupled to the memory device, the display port direct memory circuit accessing a data payload having a second predetermined size which is greater than the first predetermined size and comprising a predetermined portion of data to be displayed; and a display port coupled to the display port direct memory access circuit, the display port generating the payload data; wherein the display port direct memory access circuit accesses the data payload stored in the memory device in response to a descriptor having a plurality of addresses corresponding to a predetermined number of the data blocks stored in the memory device.

A method, implemented in an integrated circuit, for enabling access to data is also described. The method comprises storing data blocks having a first predetermined size in a memory device; receiving, at a direct memory access circuit, a descriptor having a plurality of addresses corresponding to a predetermined number of the data blocks stored in the memory device; and accessing, in response to a descriptor, a data payload having the predetermined number of the data blocks corresponding to the plurality of address.

Other features will be recognized from consideration of the Detailed Description and Claims, which follow.

BRIEF DESCRIPTION OF THE DRAWINGS

FIG. 2 is a table showing fields for a descriptor enabling a direct memory access circuit to access data stored in a memory;

FIG. 3 is a table showing addresses for data accessed by a direct memory access circuit using a descriptor having a plurality of addresses;

FIG. 4 is a block diagram of a direct memory access circuit implemented in the integrated circuit of FIG. 1;

FIG. 5 is a block diagram of a system for programming a device having programmable resources;

DETAILED DESCRIPTION OF THE DRAWINGS

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

The circuits and methods set forth below provide a DMA circuit that can handle a virtual address range block by using a small memory map table included in each descriptor. For a basic virtual memory block size of 4 Kbytes and an X Kbyte transaction for example, the descriptor will contain a table with (X/4+1) physical addresses, one for each MMU block, where a first and last block may not be boundary restricted. The DMA circuit will automatically detect 4 KB boundaries and seamlessly switch access between 4 KB blocks, thus providing capability similar to an MMU-based DMA circuit, but with much less hardware complexity. While a typical conventional DMA uses a descriptor that may contain a source address, a destination address, a transfer block size, and miscellaneous control and status information, a descriptor may contain an optional ordered list of additional source addresses and an optional ordered list of additional destination addresses. Each address in the lists above represents an entire memory-managed block, such as a 4 KB block that is 4 KB-aligned in physical memory.

A circuit for enabling access to data may comprise, for example, a memory device storing data blocks having a first predetermined size; and a direct memory access circuit coupled to the memory device, the direct memory circuit accessing a data payload having a second predetermined size which is greater than the first predetermined size; wherein the direct memory access circuit accesses the data payload in response to a descriptor having a plurality of addresses corresponding to a predetermined number of data blocks stored in the memory device. The plurality of addresses are located in a corresponding predetermined number of fields of the descriptor. For example, where the size of the payload data comprises a multiple N of the size of the data blocks, the plurality of addresses comprises N+1 addresses. The plurality of addresses comprises a memory map table to the memory device.

Figure 1:
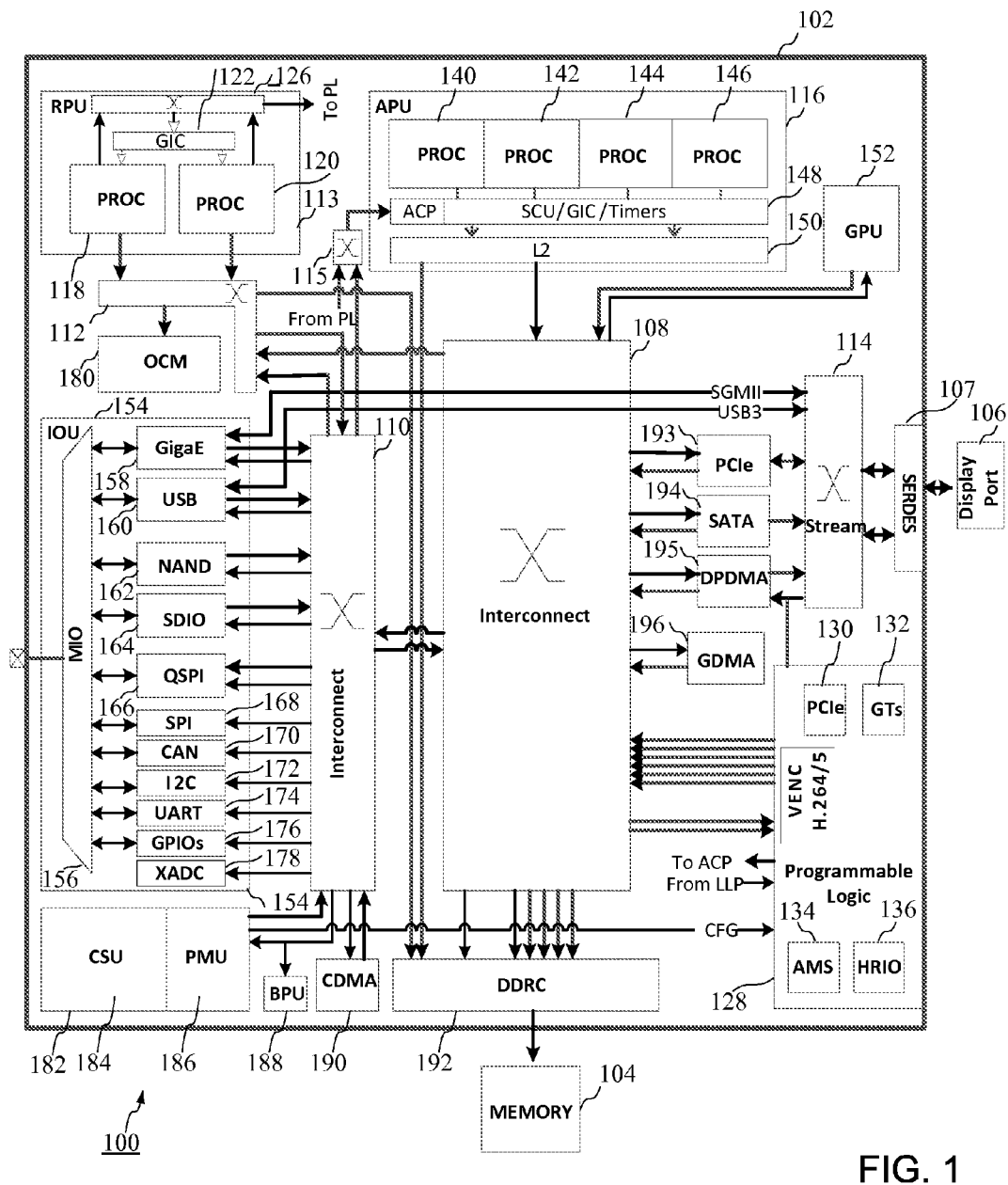
FIG. 1 is a block diagram of an integrated circuit enabling access to data stored in a memory.

Turning first to FIG. 1, a block diagram of a circuit enabling access to data stored in a memory is shown. A circuit 102 comprises various interface and control elements to access a memory 104, which may also be referred to as a DDR memory, and in one application provide data to a display port 106 by way of a serializer/deserializer (SERDES) circuit 107. An interconnect element 108 enables the communication of signals between various other elements of the circuit, such as another interconnect element 110 coupled to various input/output interfaces, an interconnect element 112 coupled to a real-time processing unit (RPU) 113, an interconnect element 114 enabling communication with the SERDES circuit 107, and an interconnect element 115 coupled to an application processing unit (APU) 116. The RPU 113 comprises a first processor 118 and a second processor 120 coupled to a general interconnect element 122 and an interconnect element 126. The circuit 102 also comprises programmable resources, such as programmable logic 128 having a Peripheral Component Interconnect Express (PCIe) block 130, Gigabit transceivers (GTs) 132, analog mixed signal (AMS) block 134, High Range input/output HRIO block (136). The APU 116 comprises a plurality of processors 140-146 which are coupled to control circuitry 148 and an L2 interface 150. The interconnect element 108 is also coupled to a graphics processing unit (GPU) 152, and an input/output block 154 by way of the interconnect element 110.

The input/output block 154 comprises an input/output multiplexer (MIO) 156 enabling access to a plurality of interface blocks, including a gigabit Ethernet (GigaE) interface 158, a universal serial bus (USB) 160, a NAND memory interface 162, an secure digital I/O (SDIO) interface 164, a quad serial peripheral interface (QSPI) interface 166, a serial peripheral interface (SPI) 168, a controller area network (CAN) interface 170, an I2C interface 172, a universal asynchronous receiver/transmitter (UART) interface 174, a general purpose (GPIO) interface 176, and an analog-to-digital converter (ADC) 178.

The interconnect element 110 also enables access to an on-chip memory (OCM) 180 by way of the interconnect element 112, and an embedded processor 182, having a configuration and security unit (CSU) 184 and a power management unit (PMU) 186, and coupled to a battery power unit (BPU) 188. The interconnect element 110 enables access to a coherent DMA (CDMA) unit 190, The interconnect element 108 enables access to a double data rate controller (DDRC) 192, which enables access to the memory 104. While the memory 104 is shown separate from the integrated circuit device 102, it should be understood that the memory 104 could be a part of the integrated circuit 102. Finally, the interconnect element 108 enables access to interface blocks including a PCIe interface 193, a serial ATA (SATA) interface 194, a display port DMA (DPDMA) 195, each of which is coupled to the interconnect element 115, and a general purpose DMA (GDMA) 196.

The DPDMA 195, which will be described in more detail in reference to FIG. 4, is preferably a source only interface because it drives video data into a display device. Therefore, the DPDMA only reads data from DDR memory and provides it to a display port (DP) subsystem. While the DPDMA 195 does not require writing (i.e. updating) data to DDR memory, it may however perform a descriptor write to update DDR memory, as will be described in more detail below. To meet the strict latency requirements, DPDMA 195 preferably has a one-hop path to DDR memory.

By using a descriptor-based architecture, the DPDMA enables dividing a frame buffer into data portions, which may be as small as 4 KB data portions. A circular chain of descriptors may be maintained per channel, where the DPDMA goes through the chain and provide the data to a display port. The DPDMA 195 preferably generates a fixed number of transactions every fetch request, where the data payload may end at line boundary or frame boundary, but preferably not within a line.

Turning now to FIG. 2, a table having fields for a descriptor enabling a direct memory access circuit to access data stored in a memory is shown. Word 0 comprises a preamble which enables the DPDMA circuit to check the validity of the descriptor by comparing the preamble with predefined preamble value. In case of error, the DPDMA 195 generates an interrupt to indicate this error.

Word 0 also comprises an EN_DSCR_DONE_INTR bit. If this bit is set, the DPDMA will generate an interrupt to indicate that current descriptor processing is done. If descriptor update is enabled, the DPDMA updates (i.e. writes back) the descriptor and waits for a write response to generate an interrupt. If a DSCR update is not requested, it generates interrupt once it receive all outstanding transactions responses after descriptor is processed. An EN_DSCR_UP field enables the DPDMA to update the descriptor by writing status and timestamp information back to DDR memory. If this bit is not set, DPDMA will not update the descriptor.

An IGNR_DONE bit enables the DPDMA to ignore the done bit and process the descriptor even if done bit is set. A BURST_TYPE bit enables the DPDMA to use a "INCR" type burst for data read, or a "FIXED" type burst for a data read. AXCACHE bits enable the DPDMA to use these bits for during data read. DSCR read transaction gets AXCACHE bits from DPDMA APB register. AXPROT bits are used by the DPDMA during AXI command generation for data read. A MODE bit is also provided to enable the DPDMA to supports two mode of operation, the Contiguous Mode and the Fragmented Mode as will be described in more detail below.

A LAST_DSCR bit is provided to indicate if a current descriptor is a last descriptor in a chain, a Next Address is not valid and DPDMA should stop operation, and a "0" once the DPDMA is done processing a current descriptor, where the DPDMA fetches a next descriptor from NEXT ADDR. Once the DPDMA is done processing this descriptor it will fetch first descriptor of the next frame.

EN_CRC_CHK comprises CRC information stored at the end of the descriptor indicating if the DPDMA should process a descriptor based upon whether the descriptor is valid or not. A DONE bit is also included. If this bit is set upon read, the DPDMA will consider this as an error condition and generates interrupt, indicating that the DPDMA has reached the end of the chain unwillingly. In a write from the DPDMA, the DPDMA will write a "1" to this bit once it is done processing descriptor, if descriptor update is requested. Finally, a LAST_DSCR is included to indicate the end of a task.

Word 1 comprises a Descriptor ID, which may be a unique 16 bit ID for each descriptor. This information can be used to track the location of the DPDMA. The DPDMA may provide the Descriptor ID of the current descriptor under process in an APB register. By reading this register, the location of the DPDMA channel can be determined within a descriptor chain.

Word 2 comprises XFER_SIZE data which indicate total payload size in bytes. Contiguous Mode valid transfer size can be one or more line (which is preferably an integer multiple of a line), or size of one frame (for example 128×32 image resolution with pixel resolution 4B). In the Fragmented Mode, it will generally indicate line size in bytes (i.e. XFER_SIZE will be the same as LINE_SIZE).

Word 3 comprises a LINE_SIZE that is an 18-bit field indicating a size of a line in bytes and a STRIDE which is a 14-bit field indicating a stride value in (16 Byte) resolution. The STRIDE field is only used in contiguous mode when transfer size is larger than line size. The STRIDE field is not used in fragmented mode, as it is always line wide.

Words 4 and 5 comprise a TIME_STAMP_LSB and a TIME_STAMP_MSB, where the DPDMA updates the 42-bit time stamp information once it is done processing the descriptor. This functionally can be enabled by EN_D-SCR_UP. Time stamp value is captured when the DPDMA starts processing the descriptor.

Word 6 comprises an ADDR_EXT, which is a 12-bit address extension for following addresses, and may be used with NEXT DSCR and SRC ADDR field to generate 44-bit addresses.

Word 7 comprises NEXT_ADDR data which is used for a next descriptor fetch if LAST_DSCR is not set. Word 8 comprises SRC_ADDR data which is a start address of the data payload, followed by the ADDR_EXT_23 of Word 9, which is a 12-bit address extension for following addresses, which includes the following fields to generate 44 bit address: SRC_ADDR2_EXT, and SRC_ADDR3_EXT_ADDR_EXT_45, (i.e. another 12 bit address extension for following addresses). These fields may be used to generate 44-bit address: SRC_ADDR4_EXT and SRC_ADDR5_EXT SRC_ADDR2-SRC_ADDR5.

Words 11-14 include the SRC_ADDR2-SRC_ADDR5, which are a 32 bit start address of each data payload fragment after the first data payload fragment. That is, the multiple addresses associated with a descriptor enables a DMA circuit handle a virtual address range block by using a small memory map table included in each descriptor, as set forth above. Finally, word 15 includes CRC data, which is calculated using a 128-bit sum. This field is only valid if EN_CRC_CHK field is set, where the CRC value is generated and stored. If a CRC check is enabled, DPDMA uses the CRC field to verify the data integrity.

Turning now to FIG. 3, a table having addresses for data accessed by a direct memory access circuit using a descriptor having a plurality of addresses is shown. That is, an actual address for the location of the data stored in the memory, such as memory 104, is provided. As shown in FIG. 3, the actual addresses in memory are not in sequential memory locations, and the actual addresses stored in the fragmented address fields (SCR_ADDR-SCR_ADDR5) provide a virtual address range block for accessing multiple address locations in memory for a single DMA descriptor.

Turning now to FIG. 4, a block diagram of a direct memory access circuit such as the DPDMA 195 implemented in the integrated circuit of FIG. 1 is shown. According to one implementation, the DPDMA 195 may comprise various interfaces for enabling communication with a display. The DPDMA 195 comprises various blocks for receiving data from or providing data to other portions of the integrated circuit device, including a streaming video buffer 402, a streaming audio buffer 404, and AXI master and DMA buffer 406, and AXI/APB slave port buffer 408, each buffer of which may be a first-in, first-out (FIFO) memory element, for example. A mixer circuit 410 is provided to couple signals to the display port core 412. A host register 414 is also coupled between the AXI/APB slave port 408 and the display port core 412. An audio/visual (A/V) timing generator 416 is also coupled to the display port core 412. A time system clock 418 is also included to provide any necessary clocks.

The DPDMA 195 is designed to satisfy display port needs, such as 2-D frame buffer with line stride, continuous flow of data without over/under flowing DP buffers, and may be implemented using scatter/gather architecture. DPDMA supports two descriptor payload modes to enable large contiguous memory requirements when storing line/frame data. The DPDMA reads the data at a regular interval and feeds it to DP buffers (e.g. buffers 402-408). At the DP core, video data is read at the video pixel rate out of a FIFO.

The DPDMA 195 supports two descriptor payload formats, contiguous payload and fragmented payload. Contiguous payload format is efficient, where large chunks of contiguous memory is available. A transfer size is preferably an integer multiple of frame or line, where a descriptor payload has to end at line or frame boundary. The DPDMA 195 may use the stride information along with horizontal line resolution to determine the end of line and start of the next line. For pixel resolution of 4B, it may take up to 20 KB to store single line in memory. Because it is difficult to assign 20 KB of contiguous memory in some environments, a fragmented descriptor mode may be beneficial. a contiguous descriptor preferably will not store more than single frame worth of data, and a transfer size should be integer multiple of line size.

In the fragmented mode, a maximum resolution line supported is 20 KB. A single line can be divided into multiple fragments to store single line data payload in non-contiguous space. In fragmented mode, each descriptor is divided in up to 5 fragments, where each fragment can store up to 4 KB data for example. Because it is possible to start and end data payload on a non-4 KB boundary, software can use up to 5 fragments or data portions to store a whole line, where each data block other than the first data block and the last data block are boundary restricted. A fragment descriptor transfer size must be same as a line size, where the fragmented descriptor only hold one line worth of data. This may be used if a line size is more than 4 k and contiguous space cannot be allocated. All fragment address is 128 B aligned. For example, for a line size is 10 KB, the largest chunk of contiguous memory available is 4 KB and start of the line data pay load is not 4K aligned, where the Source Address for each fragment is 128 B aligned.

Turning now to FIG. 5, a block diagram of a system for programming a device having programmable resources according to an embodiment is shown. In particular, a computer 502 is coupled to receive a circuit design 504 from a memory 506, and generate a configuration bitstream which is stored in the non-volatile memory 506. As will be described in more detail below, the circuit design may be a high level design, such as a circuit design defined in a hardware description language (HDL). Also, the computer may be configured to run software that generates a configuration bitstream which is stored in the non-volatile memory 508 and provided to an integrated circuit 510 which may be a programmable integrated circuit, such as the integrated circuit described below in FIGS. 6 and 7.

Figure 6:
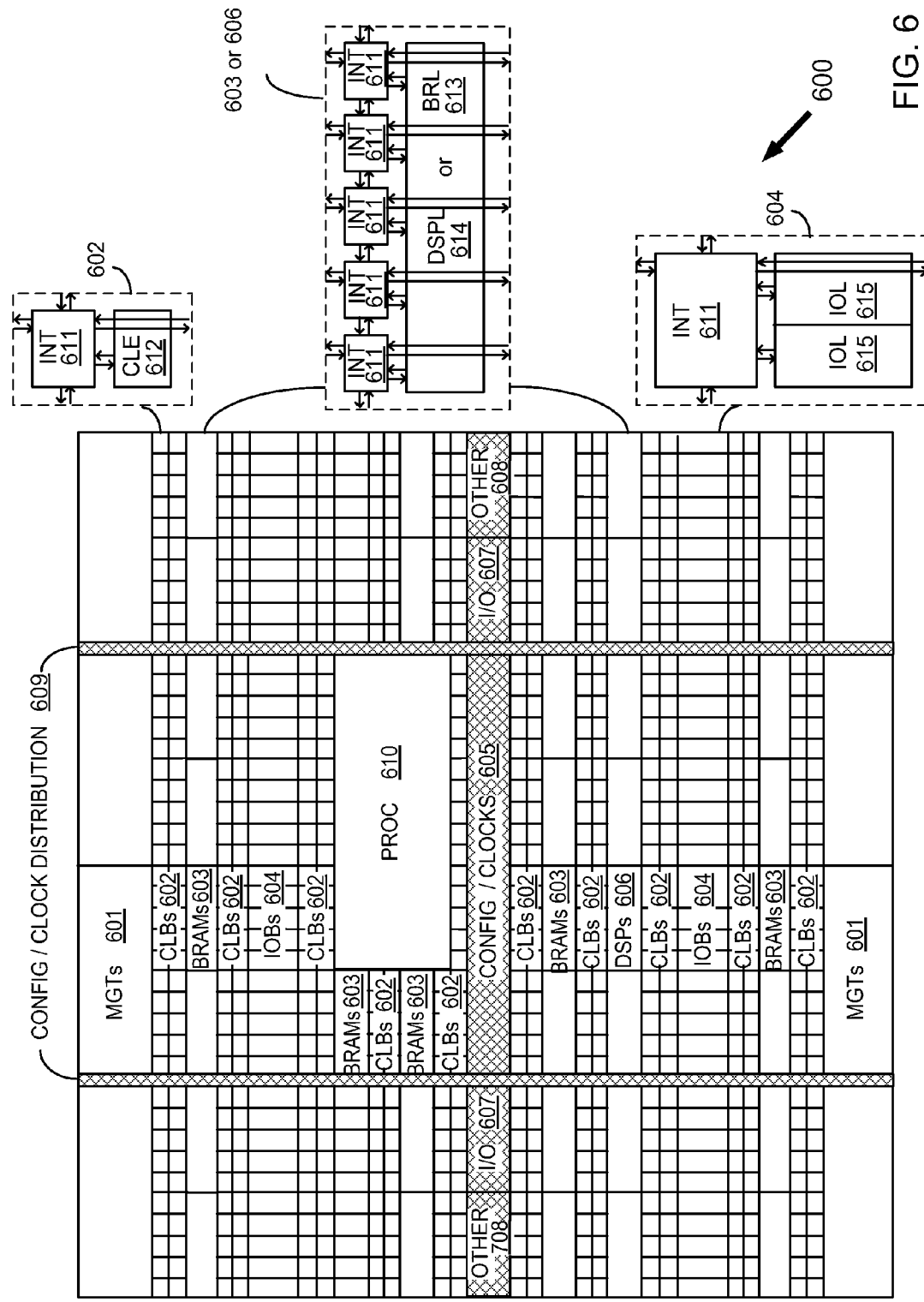
FIG. 6 is a block diagram of a device having programmable resources which may implement the circuits of FIGS. 1-5.

Turning now to FIG. 6, a block diagram of a device having programmable resources including the circuits as implemented in FIGS. 1-4 is shown. While devices having programmable resources may be implemented in any type of integrated circuit device, such as an application specific integrated circuit (ASIC) having programmable resources, other devices comprise dedicated programmable logic devices (PLDs). One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., Flash memory, as in some CPLDs), or in any other type of memory cell.

The device of FIG. 6 comprises an FPGA architecture 600 having a large number of different programmable tiles including multi-gigabit transceivers (MGTs) 601, CLBs 602, random access memory blocks (BRAMs) 603, input/output blocks (IOBs) 604, configuration and clocking logic (CONFIG/CLOCKS) 605, digital signal processing blocks (DSPs) 606, specialized input/output blocks (I/O) 607 (e.g., configuration ports and clock ports), and other programmable logic 608 such as digital clock managers, analog-to-digital converters, system monitoring logic, and so forth. Some FPGAs also include dedicated processor blocks (PROC) 610, which may be used to implement a software application, for example.

In some FPGAs, each programmable tile includes a programmable interconnect element (INT) 611 having standardized connections to and from a corresponding interconnect element in each adjacent tile. Therefore, the programmable interconnect elements taken together implement the programmable interconnect structure for the illustrated FPGA. The programmable interconnect element 611 also includes the connections to and from the programmable logic element within the same tile, as shown by the examples included at the top of FIG. 6.

For example, a CLB 602 may include a configurable logic element (CLE) 612 that may be programmed to implement user logic plus a single programmable interconnect element 611. A BRAM 603 may include a BRAM logic element (BRL) 613 in addition to one or more programmable interconnect elements. The BRAM includes dedicated memory separate from the distributed RAM of a configuration logic block. Typically, the number of interconnect elements included in a tile depends on the height of the tile. In the pictured embodiment, a BRAM tile has the same height as five CLBs, but other numbers may also be used. A DSP tile 606 may include a DSP logic element (DSPL) 614 in addition to an appropriate number of programmable interconnect elements. An IOB 604 may include, for example, two instances of an input/output logic element (IOL) 615 in addition to one instance of the programmable interconnect element 611. The location of connections of the device is controlled by configuration data bits of a configuration bitstream provided to the device for that purpose. The programmable interconnects, in response to bits of a configuration bitstream, enable connections comprising interconnect lines to be used to couple the various signals to the circuits implemented in programmable logic, or other circuits such as BRAMs or the processor.

In the pictured embodiment, a columnar area near the center of the die is used for configuration, clock, and other control logic. The config/clock distribution regions 609 extending from this column are used to distribute the clocks and configuration signals across the breadth of the FPGA. Some FPGAs utilizing the architecture illustrated in FIG. 6 include additional logic blocks that disrupt the regular columnar structure making up a large part of the FPGA. The additional logic blocks may be programmable blocks and/or dedicated logic. For example, the processor block PROC 610 shown in FIG. 6 spans several columns of CLBs and BRAMs.

Note that FIG. 6 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual FPGA more than one adjacent column of CLBs is typically included wherever the CLBs appear in order to facilitate the efficient implementation of user logic. While the embodiment of FIG. 6 relates to an integrated circuit having programmable resources, it should be understood that the circuits and methods set forth in more detail below could be implemented in any type of ASIC.

Figure 7:
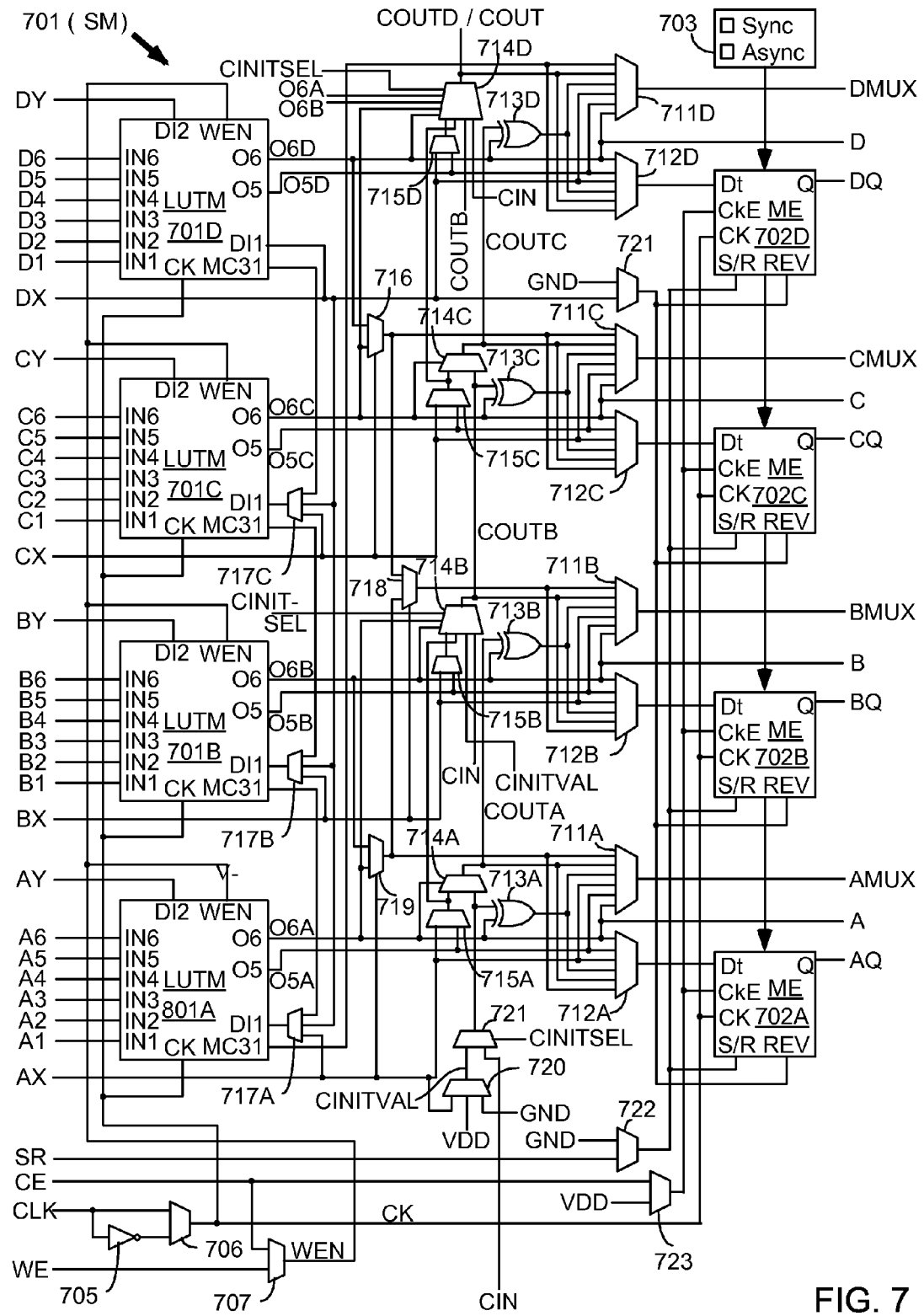
FIG. 7 is a block diagram of a configurable logic element of the device of FIG. 6.

Turning now to FIG. 7, block diagram of a configurable logic element of the device of FIG. 6 is shown. In particular, FIG. 7 illustrates in simplified form a configurable logic element of a configuration logic block 602 of FIG. 6. In the embodiment of FIG. 7, slice M 701 includes four lookup tables (LUTMs) 701A-701D, each driven by six LUT data input terminals A1-A6, B1-B6, C1-C6, and D1-D6 and each providing two LUT output signals O5 and O6. The O6 output terminals from LUTs 701A-701D drive slice output terminals A-D, respectively. The LUT data input signals are supplied by the FPGA interconnect structure via input multiplexers, which may be implemented by programmable interconnect element 711, and the LUT output signals are also supplied to the interconnect structure. Slice M also includes: output select multiplexers 711A-711D driving output terminals AMUX-DMUX; multiplexers 712A-712D driving the data input terminals of memory elements 702A-702D; combinational multiplexers 716, 718, and 719; bounce multiplexer circuits 722-723; a circuit represented by inverter 705 and multiplexer 706 (which together provide an optional inversion on the input clock path); and carry logic having multiplexers 714A-714D, 715A-715D, 720-721 and exclusive OR gates 713A-713D. All of these elements are coupled together as shown in FIG. 7. Where select inputs are not shown for the multiplexers illustrated in FIG. 7, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 7 for clarity, as well as from other selected figures herein.

In the pictured embodiment, each memory element 702A-702D may be programmed to function as a synchronous or asynchronous flip-flop or latch. The selection between synchronous and asynchronous functionality is made for all four memory elements in a slice by programming Sync/Asynch selection circuit 703. When a memory element is programmed so that the S/R (set/reset) input signal provides a set function, the REV input terminal provides the reset function. When the memory element is programmed so that the S/R input signal provides a reset function, the REV input terminal provides the set function. Memory elements 702A-702D are clocked by a clock signal CK, which may be provided by a global clock network or by the interconnect structure, for example. Such programmable memory elements are well known in the art of FPGA design. Each memory element 702A-702D provides a registered output signal AQ-DQ to the interconnect structure. Because each LUT 701A-701D provides two output signals, O5 and O6, the LUT may be configured to function as two 5-input LUTs with five shared input signals (IN1-IN5), or as one 6-input LUT having input signals IN1-IN6.

In the embodiment of FIG. 7, each LUTM 701A-701D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 717A-717C for LUTs 701A-701C), or to the two 32-bit RAMs via input terminals DI1 and DI2. RAM write operations in the LUT RAMs are controlled by clock signal CK from multiplexer 706 and by write enable signal WEN from multiplexer 707, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 701A may also be provided to the general interconnect structure for shift register chaining, via output select multiplexer 711D and CLE output terminal DMUX. Accordingly, the circuits and methods set forth above may be implemented in a device such as the devices of FIGS. 6 and 7, or any other suitable device.

Figure 8:
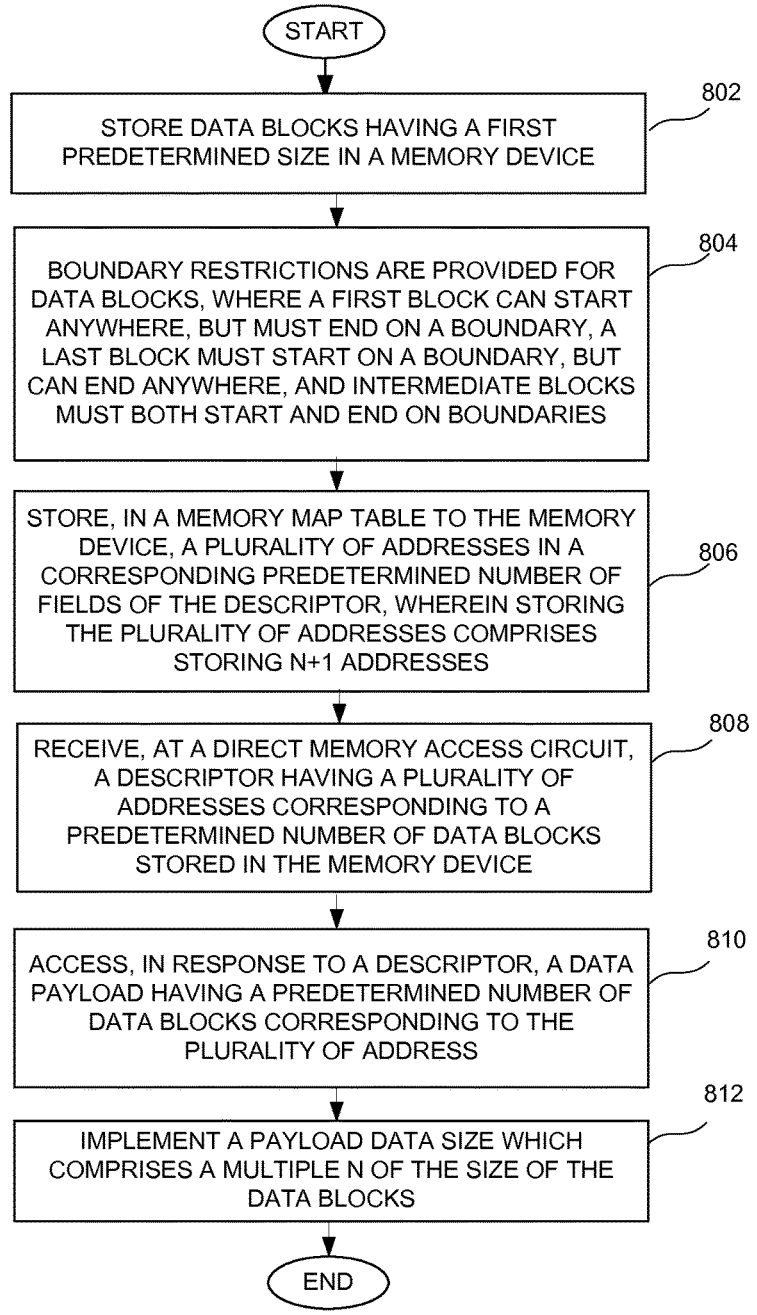
FIG. 8 is a flow chart showing a method of accessing data stored in a memory.

Turning now to FIG. 8, a flow chart shows a method of enabling access to data in an integrated circuit. In particular, data blocks having a first predetermined size are stored in a memory device at a step 802. Boundary restrictions are provided for data blocks at a step 804, where a first block can start anywhere, but must end on a boundary (e.g. a 4 KB boundary), a last block must start on a boundary (e.g. a 4 KB boundary), but can end anywhere, and intermediate blocks must both start and end on boundaries (e.g. 4 KB boundaries). A plurality of addresses are stored in a corresponding predetermined number of fields of the descriptor in a memory map table to the memory device, wherein storing the plurality of addresses comprises storing N+1 addresses at a step 806. A descriptor having a plurality of addresses corresponding to a predetermined number of data blocks stored in the memory device are received at a direct memory access circuit at a step 808. A data payload having a predetermined number of data blocks corresponding to the plurality of address is accessed in response to a descriptor at a step 810. A payload data size which comprises a multiple N of the size of the data blocks is implemented at a step 812. While specific elements of the method are described, it should be understood that additional elements of the method, or additional details related to the elements 802-812, could be implemented according to the disclosure of FIGS. 1-7.

It can therefore be appreciated that circuits for and methods of enabling the access to data have been described. It will be appreciated by those skilled in the art that numerous alternatives and equivalents will be seen to exist which incorporate the disclosed invention. As a result, the invention is not to be limited by the foregoing embodiments, but only by the following claims.

We claim:

1. A circuit for enabling access to data, the circuit comprising:
   a memory device storing data blocks having a first predetermined size;
   a direct memory access circuit coupled to the memory device, the direct memory circuit accessing a data payload having a second predetermined size which is greater than the first predetermined size. wherein the second predetermined size of the payload data comprises a multiple N of the first predetermined size of the data blocks;
   wherein the direct memory access circuit accesses the data payload in response to a descriptor having a plurality of addresses corresponding to a predetermined number of the data blocks stored in the memory device; and
   wherein the plurality of addresses comprises N+1 addresses and each data block other than a first data block and a last data block of the plurality of data blocks are boundary restricted.

2. The circuit of claim 1 wherein the plurality of addresses is located in a corresponding predetermined number of fields of the descriptor.

3. The circuit of claim 1 wherein the plurality of addresses comprises a memory map table to the memory device.

4. The circuit of claim 1 wherein the descriptor comprises a field having a next descriptor.

5. A circuit for enabling access to data, the circuit comprising:
   a memory device storing data blocks having a first predetermined size;
   a display port direct memory access circuit coupled to the memory device, the display port direct memory circuit accessing a data payload having a second predetermined size which is greater than the first predetermined size and comprising a predetermined portion of data to be displayed, wherein the second predetermined size of the payload data comprises a multiple N of the first predetermined size of the data blocks;
- a display port coupled to the display port direct memory access circuit, the display port generating the payload data;
- wherein the display port direct memory access circuit accesses the data payload stored in the memory device in response to a descriptor having a plurality of addresses corresponding to a predetermined number of the data blocks stored in the memory device, wherein the plurality of addresses comprises N+1 addresses and each data block other than a first data block and a last data block of the plurality of data blocks are boundary restricted.

6. The circuit of claim 5 wherein the plurality of addresses is located in a predetermined number of fields of the descriptor.

7. The circuit of claim 5 wherein the plurality of addresses comprises a memory map table to the memory device.

8. The circuit of claim 5 wherein the descriptor comprises a field having a next descriptor.

9. A method of enabling access to data, the method comprising:
- storing data blocks having a first predetermined size in a memory device;
- receiving, at a direct memory access circuit, a descriptor having a plurality of addresses corresponding to a predetermined number of the data blocks stored in the memory device, wherein storing the plurality of addresses comprises storing N+1 addresses;
- accessing, in response to a descriptor, a data payload having the predetermined number of the data blocks corresponding to the plurality of address;
- implementing a payload data size which comprises a multiple N of the first predetermined size of the data blocks; and
- providing boundary restrictions for each data block other than a first data block and a last data block of the plurality of data blocks.

10. The method of claim 9 further comprising storing the plurality of addresses in a corresponding predetermined number of fields of the descriptor.

11. The method of claim 9 wherein storing the plurality of addresses comprises storing a memory map table to the memory device.

* * * * *